United States Patent
Weng

(10) Patent No.: US 6,983,888 B2
(45) Date of Patent: Jan. 10, 2006

(54) PORTABLE WIRELESS ANTI-THEFT USB DISC

(76) Inventor: Cheng-Fu Weng, P.O. Box No. 6-57, Junghe, Taipei 235 (TW)

( * ) Notice: Subject to any disclaimer, the term of this patent is extended or adjusted under 35 U.S.C. 154(b) by 216 days.

(21) Appl. No.: 10/651,975

(22) Filed: Sep. 2, 2003

(65) Prior Publication Data

US 2005/0048917 A1    Mar. 3, 2005

(51) Int. Cl.
*G06K 19/06*    (2006.01)
(52) U.S. Cl. ............... 235/492; 235/382; 235/451; 340/5.2; 340/5.6; 713/200
(58) Field of Classification Search ............. 235/492, 235/382, 382.5, 380, 451; 710/74; 361/686, 361/737; 713/200, 201, 202; 340/5.1, 5.2, 340/5.6, 5.61, 5.64, 5.8, 571
See application file for complete search history.

(56) References Cited

U.S. PATENT DOCUMENTS

| | | | | |
|---|---|---|---|---|
| 5,952,641 A * | 9/1999 | Korshun | .................. | 235/382 |
| 6,088,450 A * | 7/2000 | Davis et al. | .................. | 235/382 |
| 6,446,862 B1 * | 9/2002 | Mann | .................. | 235/380 |
| 6,504,480 B1 * | 1/2003 | Magnuson et al. | .................. | 340/571 |
| 6,522,534 B1 * | 2/2003 | Wu | .................. | 361/686 |
| 6,561,421 B1 * | 5/2003 | Yu | .................. | 235/451 |
| 6,594,154 B1 * | 7/2003 | Brewer et al. | .................. | 235/492 |
| 6,763,315 B2 * | 7/2004 | Xydis | .................. | 702/127 |
| 6,763,410 B2 * | 7/2004 | Yu | .................. | 710/74 |
| 6,837,422 B1 * | 1/2005 | Meder | .................. | 235/382 |
| 2002/0192009 A1 * | 12/2002 | Tuli | .................. | 401/195 |
| 2003/0043111 A1 * | 3/2003 | Huang | .................. | 345/156 |
| 2004/0064728 A1 * | 4/2004 | Scheurich | .................. | 713/201 |
| 2004/0080989 A1 * | 4/2004 | Yu | .................. | 365/200 |
| 2005/0083315 A1 * | 4/2005 | Pei | .................. | 345/179 |

* cited by examiner

Primary Examiner—Jared J. Fureman

(57) ABSTRACT

The invention relates to a portable wireless anti-theft flash memory having a body proper in which there are a flash memory, a high frequency receiver circuit, and a monode switch to go with a cap, in which are a high frequency transmitter, an encoding circuit, and a counter, for casing the body proper. Connecting the body proper to a computing device enables high frequency transmitting, receiving, and turning on flash memory firewall. When the transmitting source is a distance away, the firewall becomes engaged thus disabling the flash memory to prevent loss of data from theft for safety purpose.

2 Claims, 6 Drawing Sheets

PORTABLE WIRELESS ANTI-THEFT USB DISC

BACKGROUND OF THE INVENTION (a) Field of the Invention

The invention relates to a portable wireless anti-theft USB disc using high frequency transmitting to turn on and off the flash memory firewall to protect from data theft.

(b) Description of the Prior Art

The main function of a portable memory device (USB disc) is to provide easy transportability of data for consumers wherein the disadvantage of the prior art is low privacy and safety of the stored data from theft. There are products in the market now that possess security function but compatible driver software must be employed. Furthermore, security code must be entered manually and each computer must be loaded with the compatible driver software in order for normal use of the storage capacity—very inconvenient. Also, the device can be reused simply by reformatting rendering security function useless let alone preventing hacking.

SUMMARY OF INVENTION

The invention relates to a portable wireless anti-theft USB disc using high frequency transmitting to turn on and off the flash memory firewall to protect from data theft.

The invention consists of a portable wireless anti-theft USB disc having a body proper in which there are a flash memory, a high frequency receiver circuit, and a monode control switch to go with a cap, where there are a high frequency transmitter, an encoding circuit, and a counter, for casing the body proper. Connecting the body proper to a computing device enables high frequency transmitting, receiving, and turning on flash memory firewall. When the transmitting source is a distance away, the firewall becomes engaged thus disabling the flash memory to prevent loss of data from theft for safety purpose.

The cap having the transmitting circuit of the aforesaid portable wireless anti-theft USB disc is wearable on user so that when user is close enough to the body proper and to operate the computer, the body proper can receive signals to enable memory firewall. When the cap is away with user from the computer, the memory firewall is disabled from not receiving signals.

Each of the aforesaid portable wireless anti-theft USB disc has different security codes to achieve security purpose.

To enable a further understanding of the said objectives and the technological methods of the invention herein, the brief description of the drawings below is followed by the detailed description of the preferred embodiment.

DETAILED DESCRIPTION OF THE PREFERRED EMBODIMENTS

To better understand the characteristics and novelties of the invention, descriptions shall be given with the accompanying drawings hereunder.

Figure 1:
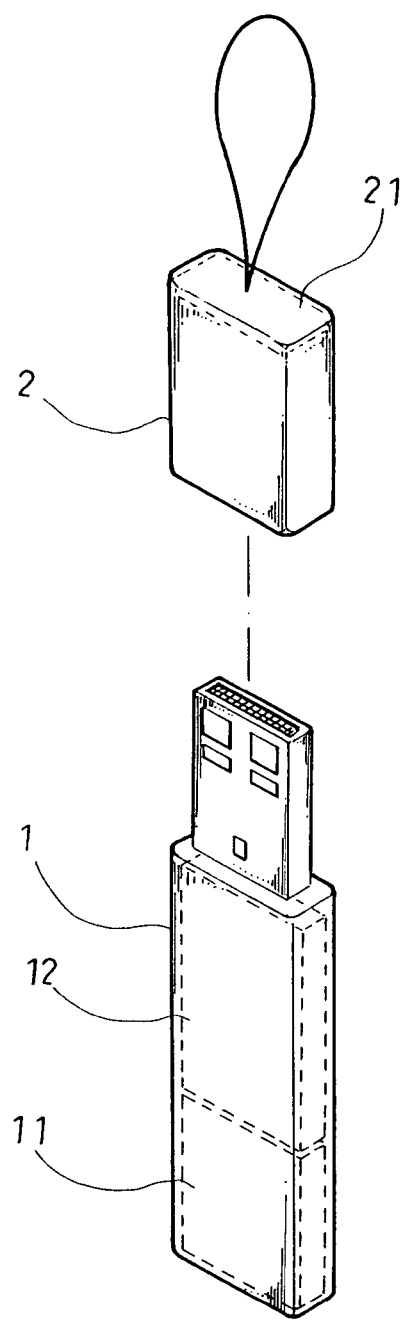
FIG. 1 shows a perspective exploded view of the entire structural combination according to the invention.
Figure 2:
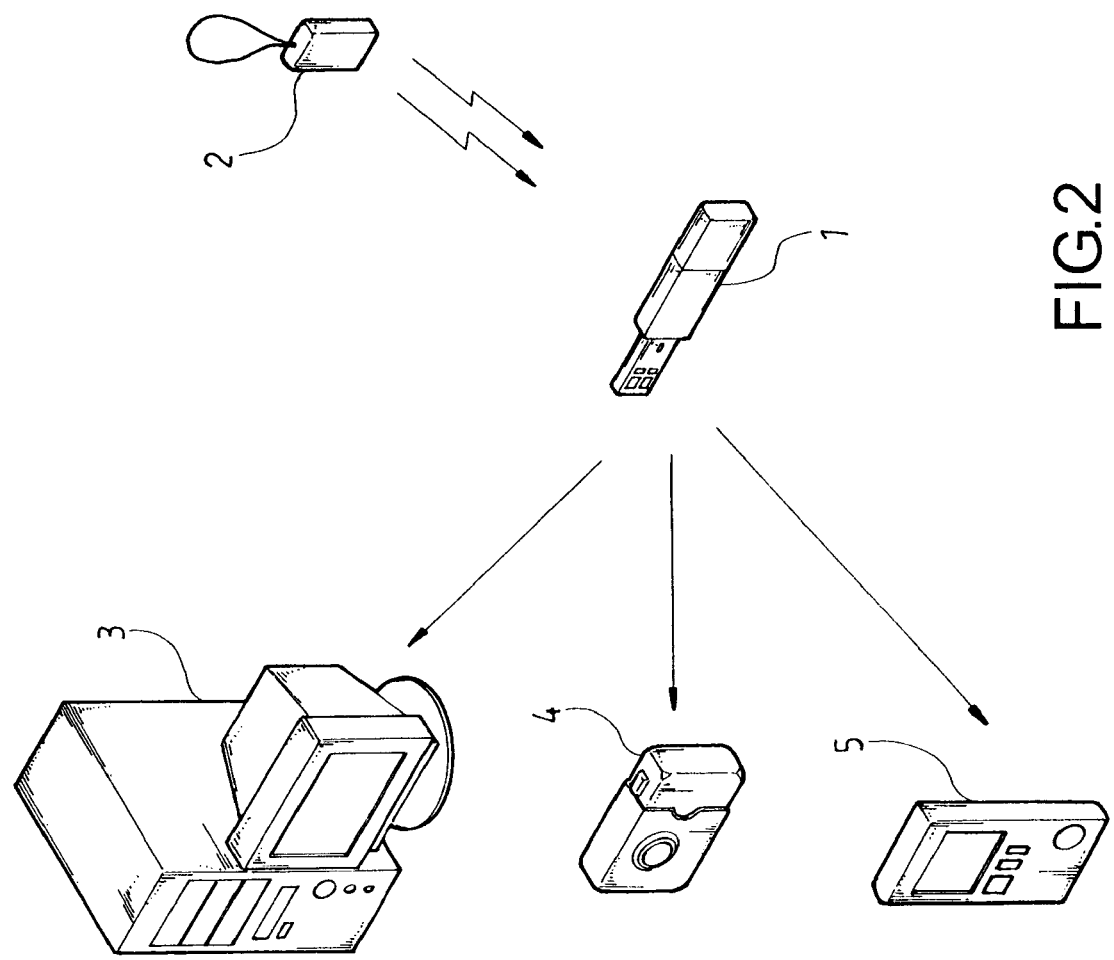
FIG. 2 shows a schematic view of the completely assembled unit according to the invention in use with other computing devices.

FIGS. 1~2 show a perspective view of the entire structural combination according to the invention and a schematic view of the completely assembled unit according to the invention in use with other computing devices. The invention consists of a body proper (1) in which there are a flash memory (11) and a high frequency receiver circuit (12) to go with a cap (2) which has a high frequency transmitter (21) that emits corresponding signal to the receiver circuit (12) Capping the cap (2) with the body proper (1) together forms a portable USB disc (100). When in use, uncap the body proper (1) from the cap (2) and connect with a computer (3), a digital camera (4), or a PDA (5) so that when the user is close to the equipment, the body proper (1) can receive the signal from the cap (2) and enables the memory firewall to render the flash memory (11) of the body proper (1) readable and writeable. When the user is out or range of the signal, the body proper (1) does not receive the signal from the cap (2), and the firewall becomes disabled making all functions of the flash memory (11) to stop to protect data.

Figure 3:
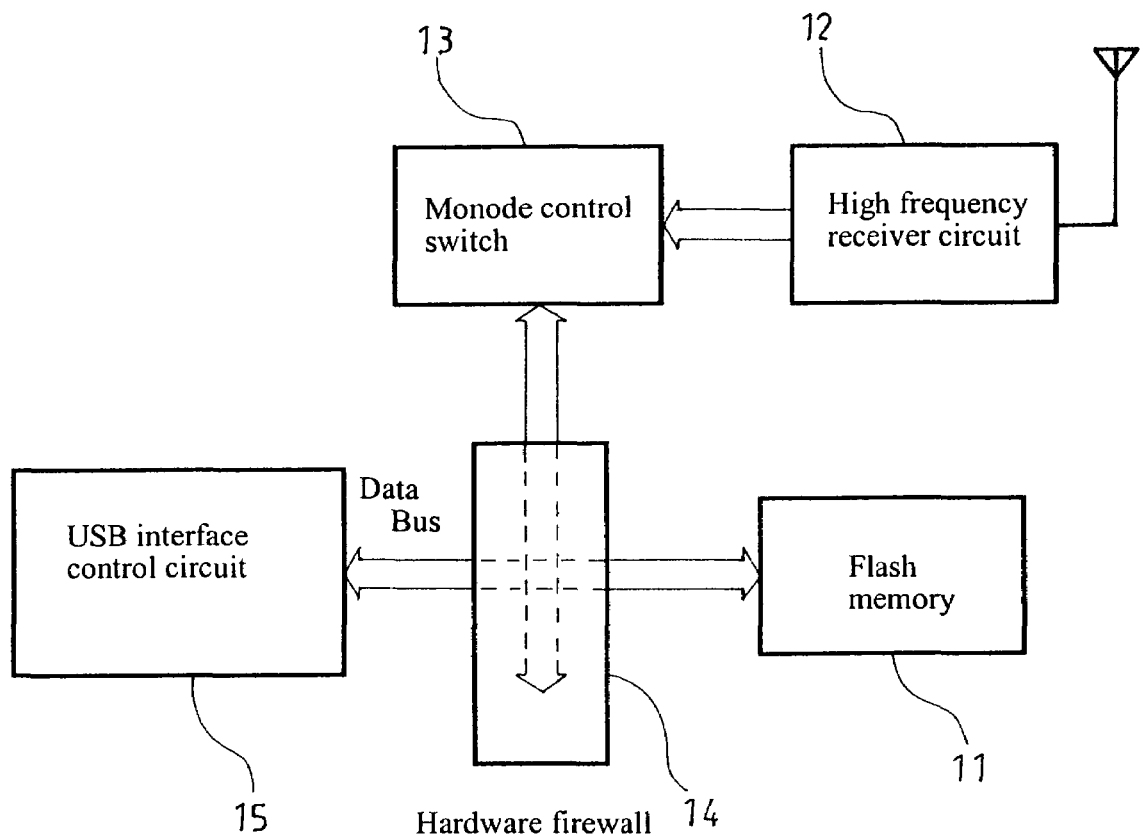
FIG. 3 shows the flow chart of the receiver circuit according to the invention.

FIG. 3 shows the flow chart of the receiver circuit (12) according to the invention. The body proper (1) contains a high frequency receiver circuit (12), a monode control switch (13), a flash memory (11), a hardware firewall (14) and memory, a USB interface control circuit (15) all of which are interconnected. When the high frequency receiver circuit (12) receives transmitted signals, through the monode control switch (13), the firewall (14) is turned on rendering the flash memory (11) to be read-and-writeable by the USB interface control circuit (15). Conversely, when the receiver circuit (12) does not get the signal, the firewall (14) is turned off, and the flash memory (11) unable to read-and-write.

Figure 4:
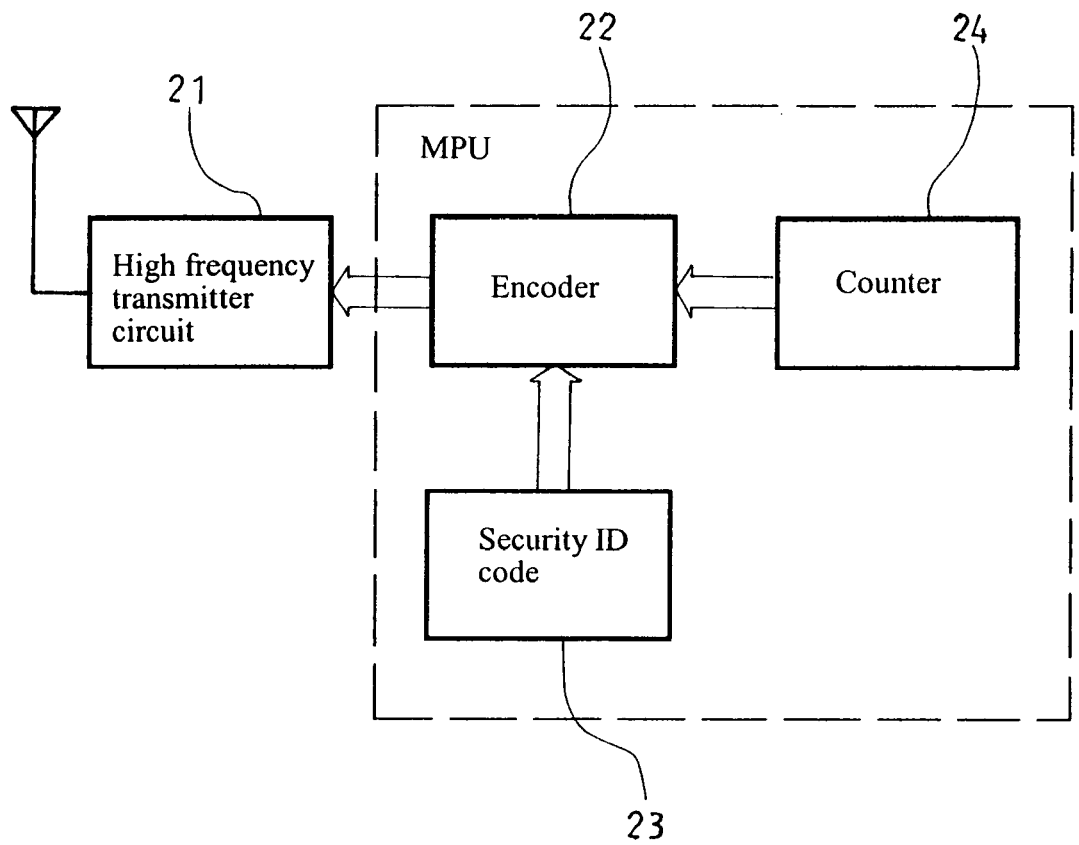
FIG. 4 shows the flow chart of the transmitter circuit according to the invention.

FIG. 4 shows the flow chart of the transmitter circuit according to the invention. The cap (2) of the invention contains a high frequency transmitter (21), an encoder (22), a security ID code (23), and a counter (24) all of which are interconnected. Through the counter (24), the transmitter (21) sends out signals intermittently to the high frequency receiver circuit (12) in the body proper (1) for security check.

Figure 5:
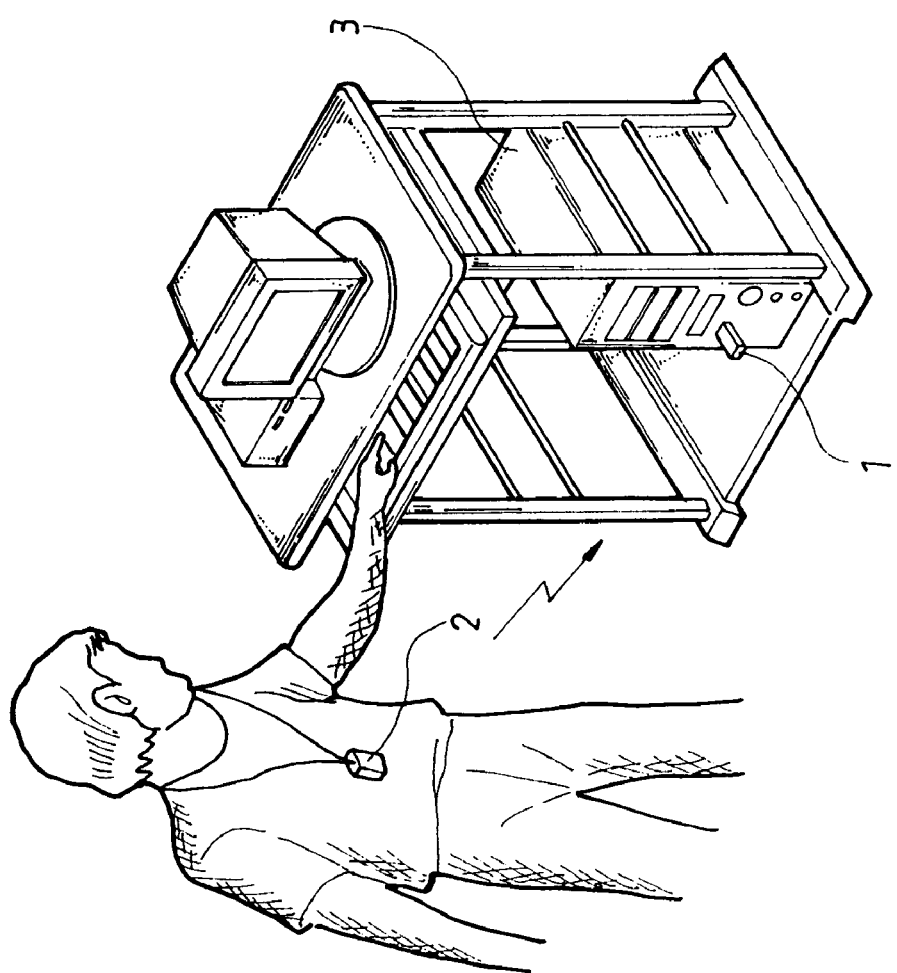
FIG. 5 shows a perspective view of the invention in use enabled.
Figure 6:
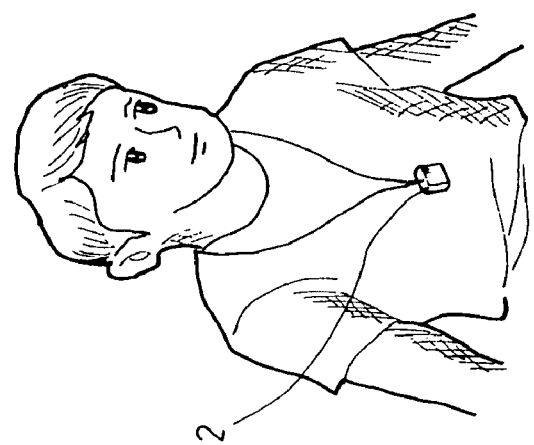
FIG. 6 shows a perspective view of the invention in use but disabled.
Figure 6:
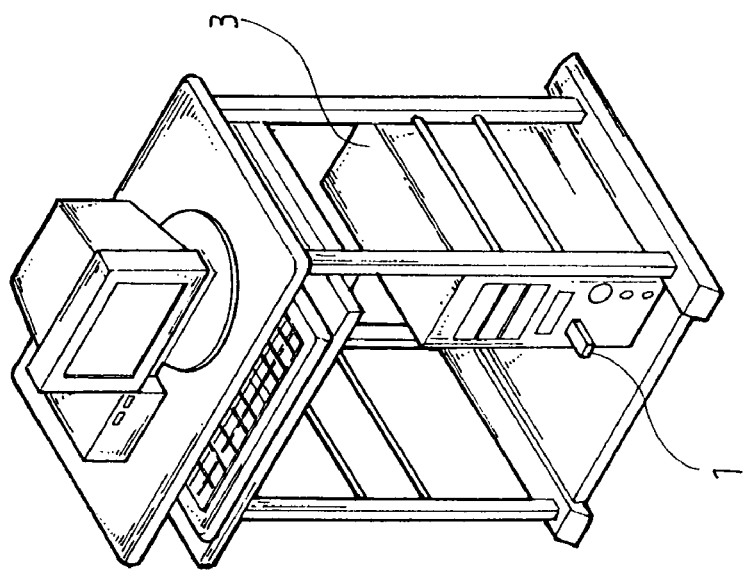

FIGS. 5 and 6 show a perspective view of the invention in use. When using the invention, the user wears the portable USB disc (100) with him. When the user needs to read and write data, he uncaps the body proper (1) from the cap (2) and connects the body proper (1) to a computer (3). Because he is close to the body proper (1), the receiver circuit (12) is able to receive the signal from the cap (2), the flash memory (11) in the body proper (1) is read-and-writeable. However, when the user is out of range, the body proper can not receive the signal so the memory firewall is turned off rendering the flash memory (11) unreadable and unwriteable in order to protect data from theft and to achieve security by lowering the chance of security code leak. Invasion by hackers to decode is greatly discouraged.

In conclusion, the invention combines a portable USB disc (100) with high frequency transmission and reception to attain protection of data, a practical and innovative design and invention; thus this application for patent.

It is of course to be understood that the embodiment described herein is merely illustrative of the principles of the invention and that a wide variety of modifications thereto may be effected by persons skilled in the art without departing from the spirit and scope of the invention as set forth in the claims.

What is claimed is:

1. A portable wireless anti-theft USB disc comprising:
a body proper, a high frequency receiver circuit, a monode control switch, a flash memory, and a memory-USB interface control circuit all interconnected;
a cap for casing the body proper, a high frequency transmitter circuit, an encoder, and a set of security ID codes all interconnected, of wherein,
when the body proper, connected to a computing device, and the cap, worn by the user, are close, a memory firewall is turned on for read-and-write because the receiver circuit in the body proper has received signals from the transmitter circuit in the cap and the memory firewall is turned off to disable the firewall when the user is out of range of the body proper to protect data from theft.

2. The portable wireless anti-theft USB disc as recited in claim 1, wherein the transmitter circuit in the cap is connected to a counter, enabling the transmitter circuit to emit signals intermittently to the receiver circuit in the body proper to maintain transceiving.

* * * * *